(12) United States Patent
Tsai et al.

(10) Patent No.: US 8,493,159 B2
(45) Date of Patent: Jul. 23, 2013

(54) RADIO FREQUENCY DEVICE

(75) Inventors: Wen-Tsai Tsai, Hsinchu (TW);
Wen-Chen Lan, Hsinchu (TW); Ta-Jen Wu, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 360 days.

(21) Appl. No.: 12/886,575

(22) Filed: Sep. 21, 2010

(65) Prior Publication Data
US 2011/0316641 A1 Dec. 29, 2011

(30) Foreign Application Priority Data
Jun. 25, 2010 (TW) .............................. 99120949 A

(51) Int. Cl.
*H04B 3/28* (2006.01)
(52) U.S. Cl.
USPC .......................................... 333/12; 333/22 R
(58) Field of Classification Search
USPC ............................................ 333/12, 22, 22 R
See application file for complete search history.

(56) References Cited

U.S. PATENT DOCUMENTS

| | | | |
|---|---|---|---|
| 6,016,084 A * | 1/2000 | Sugimoto | 333/12 |
| 6,104,258 A * | 8/2000 | Novak | 333/22 R |
| 6,727,780 B2 * | 4/2004 | Novak et al. | 333/136 |
| 6,870,436 B2 * | 3/2005 | Grebenkemper | 333/12 |
| 6,933,800 B2 * | 8/2005 | Wallace et al. | 333/12 |

OTHER PUBLICATIONS

Fujio S., Sakurai, A., Kabayama, H. "Analysis on the power/ground plane resonance damping and radiated field reduction with the RC termination", 2001 International Symposium on Electromagnetic Compatibility, vol. pp. 686-690.*

Yong Hyan Baek, Sang Jin Lee, Tae Jong Baek, Jung Hun Oh, Seok Gyu Choi, Dong Sun Kang, Sam Dong Kim, and Jin Koo Rhee, Millimeter-wave Broadband Amplifier using MHEMT, GSMM 2008 Processings, pp. 48-51.*

\* cited by examiner

*Primary Examiner* — Benny Lee
*Assistant Examiner* — Grant Ellis
(74) *Attorney, Agent, or Firm* — Winston Hsu; Scott Margo

(57) ABSTRACT

A radio frequency device is disclosed, which includes an isolation substrate, a ground layer, a first signal end, a second signal end, a radio frequency circuit, and an impedance unit. The isolation substrate includes a first plane and a second plane. The ground layer is disposed on the second plane of the isolation substrate for providing grounding. The first signal end is formed on the first plane of the isolation substrate. The second signal end is formed on the first plane of the isolation substrate and coupled to the ground layer. The radio frequency circuit is disposed on the first plane of the isolation substrate and coupled to the first signal end. The impedance unit is disposed on the first plane of the isolation substrate and coupled to the first signal end and the second signal end.

7 Claims, 12 Drawing Sheets

RADIO FREQUENCY DEVICE

BACKGROUND OF THE INVENTION

1. Field of the Invention

The invention relates to a radio frequency device, and more particularly, to a radio frequency device capable of utilizing an impedance unit as a transmission line terminal for reducing crosstalk interference.

2. Description of the Prior Art

With the rapid progression of technology, the development trend of electronic products is toward thin profile, light weight, and small size. Furthermore, an electromagnetic interference (EMI) problem has become a very challenging design task with high operating frequency. How to suppress or cancel the EMI effect and ensure that electronic products can be operated in an appropriate electromagnetic environment is an essential issue. For example, the prior art utilizes an absorber in a radio frequency circuit to overcome crosstalk or suppress radiation power for preventing interference from other circuits.

Please refer to FIG. 1, which is a schematic diagram of a radio frequency device 10 with absorbers according to the prior art. The radio frequency device 10 includes an isolation substrate 102, a ground layer 104, a radio frequency circuit 106, an open stub ST, and an absorber 108. The open stub ST belongs to part of the radio frequency circuit 106. In the prior art, the absorber 108 can be pasted onto the open stub ST for suppressing the EMI effect. Generally, the absorber 108 is manually pasted onto the corresponding open stub ST during the manufacturing process of the radio frequency device 10. However, manually pasting the absorber 108 is time consuming, laborious, and inefficient. Further, the present circuit device may have tiny size, increasing probability of inaccurately pasting the absorber 108 onto the corresponding position due to human error, causing poor suppression effect for suppressing crosstalk or radiation power. In addition, the absorber is expensive, so employing several absorbers in the radio frequency device 10 results in higher cost of production of the radio frequency device 10. In short, using the absorber in the radio frequency device 10 for suppressing the undesired crosstalk and radiation power is time consuming, laborious and expensive.

SUMMARY OF THE INVENTION

It is therefore a primary objective of the claimed invention to provide a radio frequency device.

An embodiment of the invention discloses a radio frequency device, which includes an isolation substrate comprising a first plane and a second plane; a ground layer disposed on the second plane of the isolation substrate for providing grounding; a first signal end formed on the first plane of the isolation substrate; a second signal end formed on the first plane of the isolation substrate and coupled to the ground layer; a radio frequency circuit disposed on the first plane of the isolation substrate and coupled to the first signal end; and an impedance unit disposed on the first plane of the isolation substrate and coupled to the first signal end and the second signal end.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
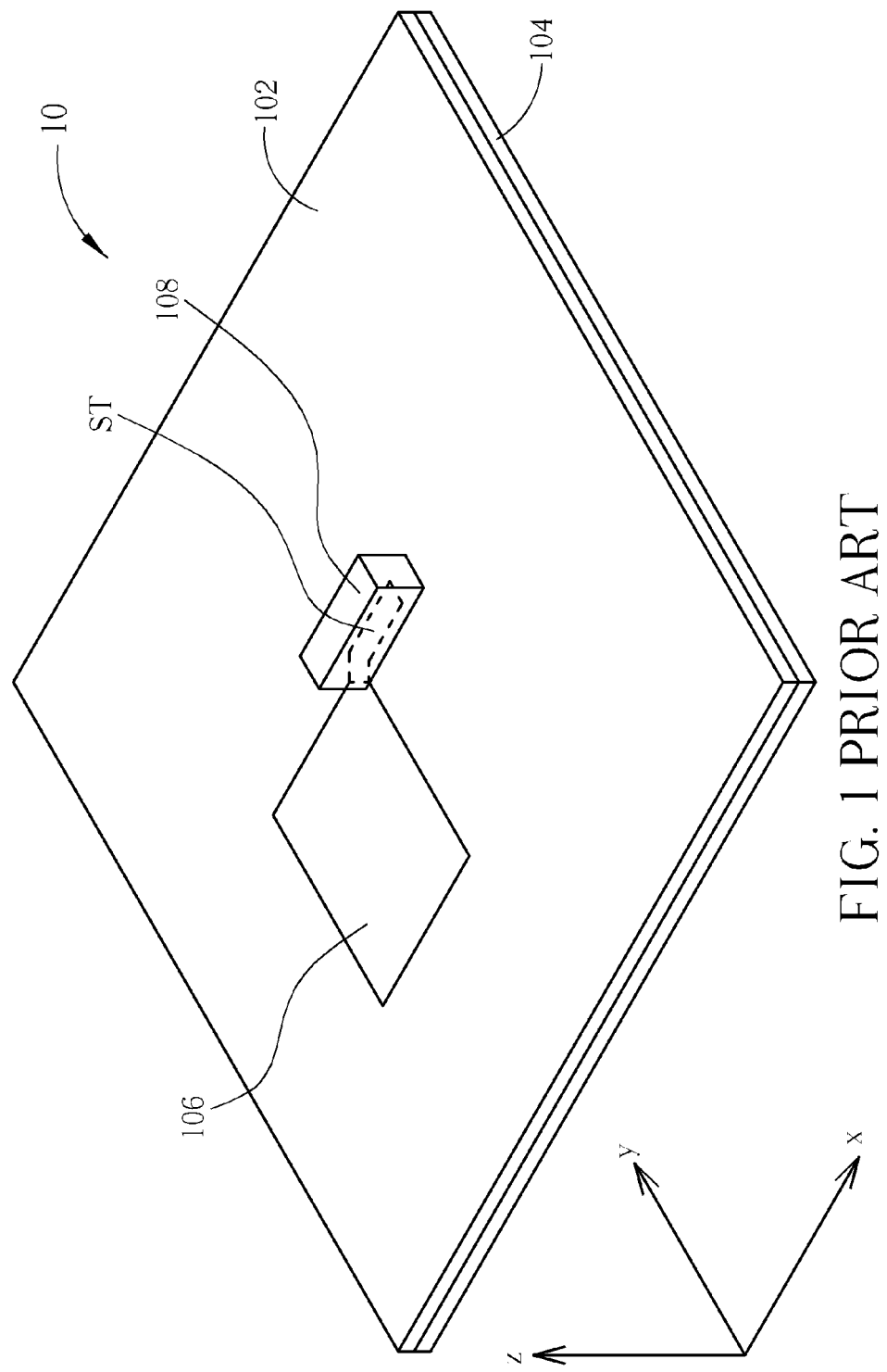
FIG. 1 is a schematic diagram of a radio frequency device with absorbers according to the prior art.
Figure 2:
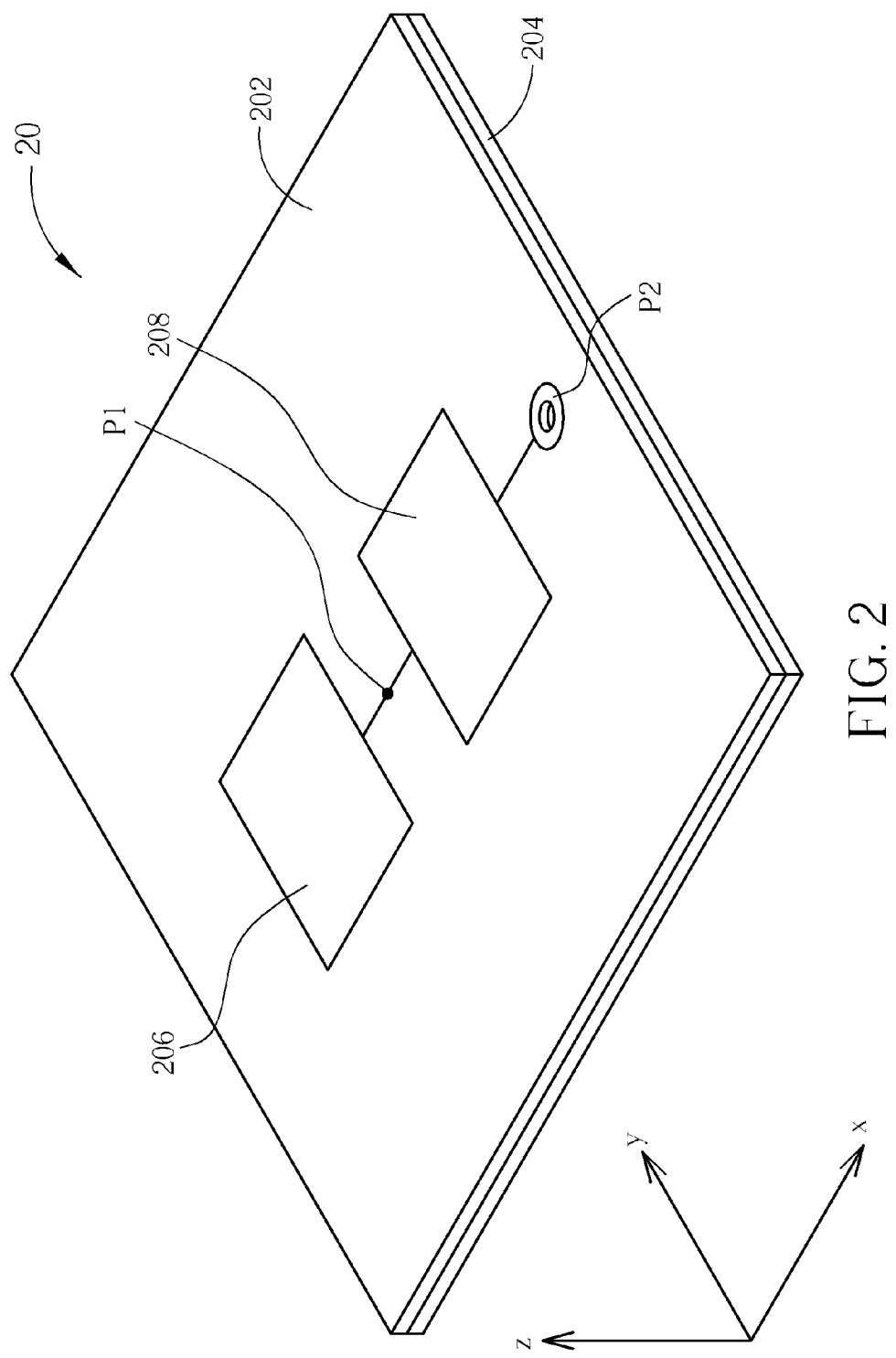
FIG. 2 is a schematic diagram of a radio frequency device according to the invention.

Please refer to FIG. 2, which is a schematic diagram of a radio frequency device 20 according to the invention. The radio frequency device 20 includes an isolation substrate 202, a ground layer 204, a radio frequency circuit 206, an impedance unit 208, and signal ends P1 and P2. The isolation substrate 202 includes a first plane and a second plane. The radio frequency circuit 206, the signal ends P1 and P2, and the impedance unit 208 are disposed on the first plane of the isolation substrate 202 (for example, the upper plane of the isolation substrate 202 shown in FIG. 2). The ground layer 204 is disposed on the second plane of the isolation substrate 202 (for example, the lower plane of the isolation substrate 202 shown in FIG. 2) for providing grounding. The radio frequency circuit 206 is coupled to the signal end P1, and the impedance unit 208 is coupled between the signal ends P1 and P2. Therefore, during operation of the radio frequency circuit 206, energy radiated from the transmission line of the radio frequency circuit 206 can be conducted to the ground layer 204 through the grounding design of the impedance unit 208 to suppress the radiation power generated by the radio frequency circuit 206 and further prevent interference with other active components.

In detail, the impedance unit 208 can be realized by a resistor. In such a situation, for the radio frequency circuit 206, the impedance unit 208 can be regarded as a high impedance terminal of a transmission line to reduce the loss caused by the effect of transmission line resistance. Furthermore, if the radio frequency circuit 206 contains DC signals, the impedance unit 208 further includes a capacitor for providing a DC blocking function to prevent short-circuiting. In other words, the impedance unit 208 can be realized by a resistor, and a capacitor connected in series with the resistor. Of course, as the capacitor is coupled between the signal end P1 and the resistor, the signals from the radio frequency circuit 206 can also be conducted to the ground layer 204 via the signal end P2 without influencing the grounding resistor effect of the resistor due to the series-connected circuit. Therefore, connection order of the resistor and the capacitor may be changed at will. For example, in the impedance unit 208, the connection relationship of the components can be as follows: a first end of the resistor is coupled to the signal end P1, a second end of the resistor is coupled to a first end of the capacitor, and a second end of the capacitor is coupled to the signal end P2; or the first end of the capacitor is coupled to the signal end P1, the second end of the capacitor is coupled to the first end of the resistor, and the second end of the resistor is coupled to the signal end P2.

Compared with the prior art, the invention utilizes the impedance unit 208 to be connected in series with the terminal of the radio frequency circuit 206 for reducing undesired radio power and crosstalk interference. As a result, the invention can eliminate costly manual processes of pasting the absorber, which significantly reduces manufacturing cost and time. Besides, the resistor and the capacitor are far cheaper than the absorber, and furthermore, the resistor and the capacitor can also be mounted with surface mount technology (SMT) for achieving more stable circuit characteristics. In other words, the invention utilizes the resistor and the capacitor rather than using the absorber for preventing the EMI problem, and reducing the manufacturing cost, and when there is no DC signal on the transmission line, the invention need only utilize the resistor for suppressing the radiation power, further reducing the manufacturing cost.

Figure 3:
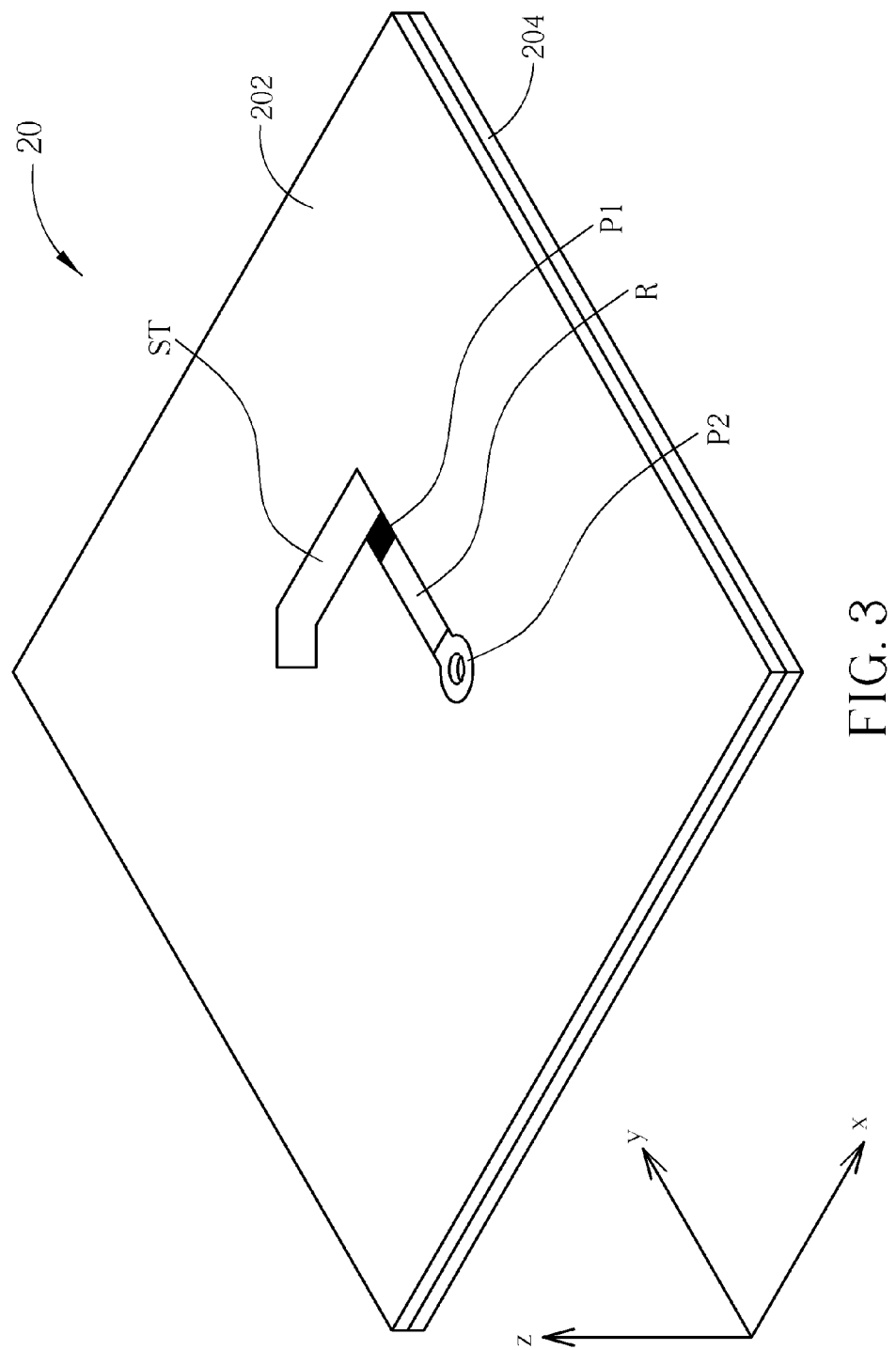
FIG. 3 is a schematic diagram of realizing the impedance unit shown in FIG. 2 by using resistor.
Figure 4:
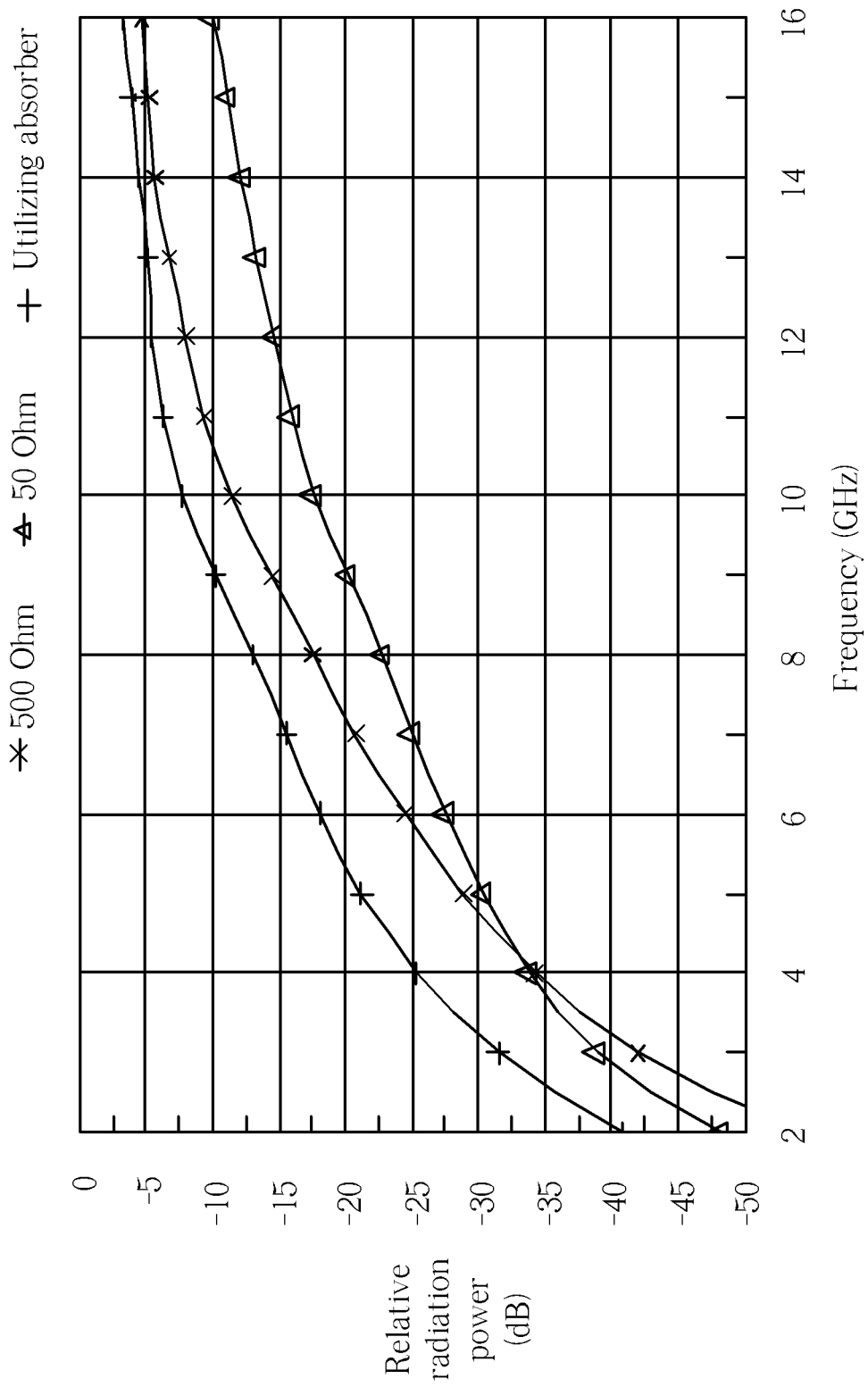
FIG. 4 is a schematic diagram illustrating radiation power of the radio frequency device shown in FIG. 3.

Please refer to FIGS. 3 and 4. FIG. 3 is a schematic diagram of realizing the impedance unit 208 shown in FIG. 2 by using a resistor R. FIG. 4 is a schematic diagram illustrating radiation power of a stub ST of the radio frequency circuit 206 of the radio frequency device 20 shown in FIG. 3. As shown in FIG. 3, the impedance unit 208 includes the resistor R coupled between the signal ends P1 and P2. Suppose the radio frequency circuit 206 (not shown in FIG. 3) is an RF choke of a low noise amplifier and a stub ST is an open stub of the RF choke. The stub ST is coupled to the signal end P1. In other words, as can been seen in FIG. 3, the invention utilizes the resistor R connected with the grounding layer 204 to serially connect to the stub ST for reducing the interference caused by the radio power of the radio frequency circuit 206. Please further refer to FIG. 4. The resistor R is realized with various resistance values, and the corresponding simulation result is shown as in FIG. 4. The horizontal axis represents operating frequency (in GHz), and the vertical axis represents radiation power (in dB). The simulated result of utilizing a 50 ohms resister for the resistor R and a 500 ohms resister for the resistor R are respectively presented in FIG. 4. The simulated result of utilizing the absorber on the stub ST (i.e. conventional method) is also presented in FIG. 4. As can been seen in FIG. 4, the radiation power of the stub ST (for both a 50 ohm resistor and a 500 ohm resistor utilized for the resistor R) is lower than utilizing the absorber (conventional method). In addition, since characteristic independence of a typical radio frequency system is usually 50 ohms, the stub ST has an ideal load feature when utilizing a 50 ohms resistor for the resistor R. In such a condition, the stub ST loses its stub characteristic, and most of the energy is conducted to the ground layer 204 via the 50 ohm resister R.

Figure 5:
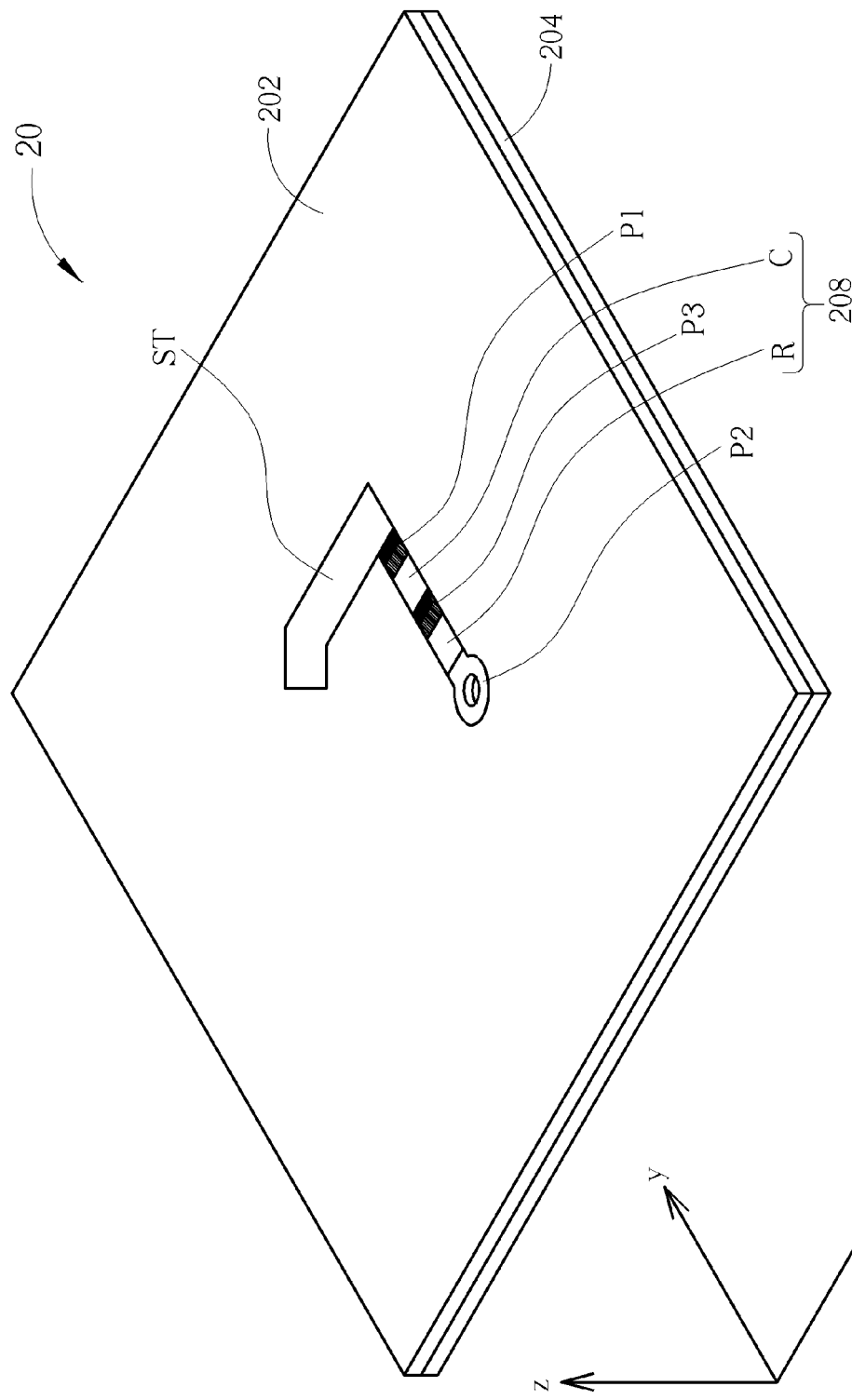
FIG. 5 is a schematic diagram of realizing the impedance unit 208 shown in FIG. 2 by using resistor and capacitor, which is connected in serial.
Figure 6:
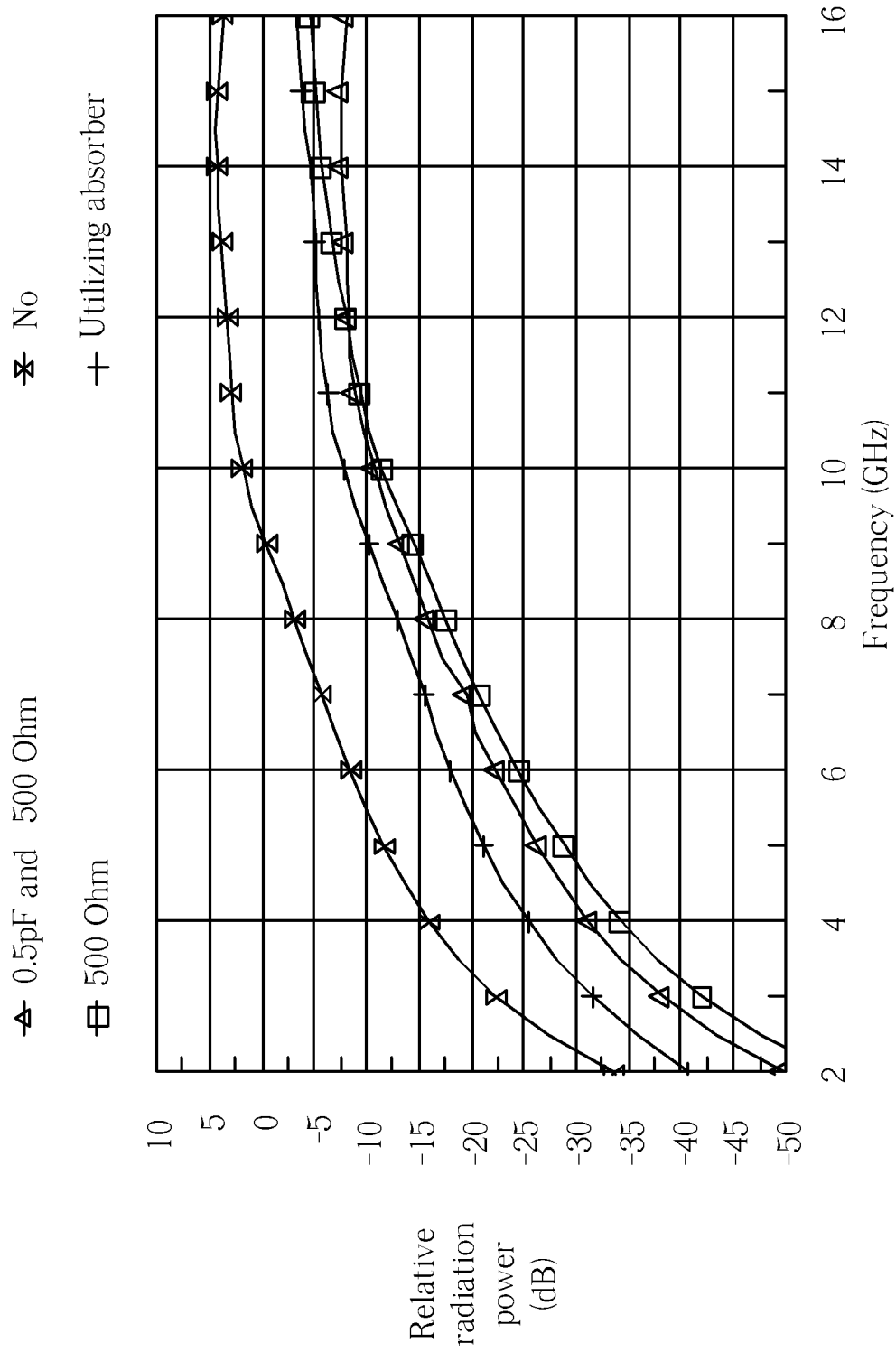
FIG. 6 is a schematic diagram illustrating radiation power of the radio frequency device shown in FIG. 5.
Figure 7:
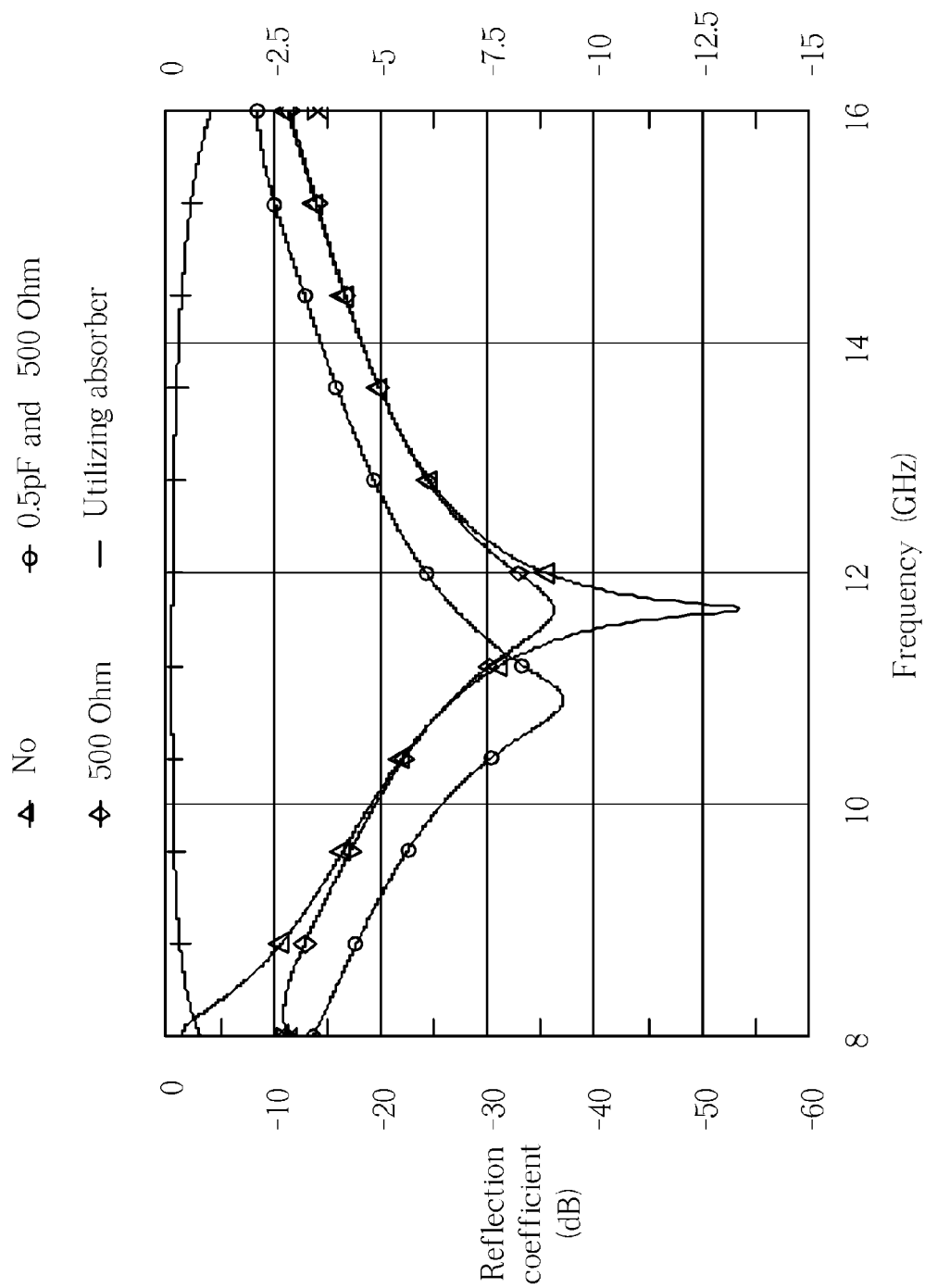
FIG. 7 is a schematic diagram illustrating distribution of reflection parameters of the radio frequency device shown in FIG. 5, which is operated at 8 to 16 GHz band.

Furthermore, regarding the application of DC blocking, please refer to FIGS. 5 and 6. FIG. 5 is a schematic diagram of realizing the impedance unit 208 shown in FIG. 2 by using a resistor R and a capacitor C which are connected in series. FIG. 6 is a schematic diagram illustrating radiation power of a stub ST of the radio frequency circuit 206 of the radio frequency device 20 shown in FIG. 5. As shown in FIG. 5, the impedance unit 208 includes the resistor R and the capacitor C, and the resistor R is connected in series with the capacitor C. The capacitor C is coupled between the signal ends P1 and P3. The resistor R is coupled between the signal ends P2 and P3. Suppose the radio frequency circuit 206 (not shown in FIG. 3) is an RF choke of a low noise amplifier. A stub ST is an open stub of the RF choke and coupled to the signal end P1. As can been seen in FIG. 5, the invention utilizes the resistor R and the capacitor C connected in series as a terminal of the radio frequency circuit 206 for reducing the radio power interference. Referring to FIG. 6, the simulated result of utilizing no EMI suppression device, an absorber on the stub ST (conventional method), a 500 ohm resister for the resistor R and a 0.5 picofarad capacitor for the capacitor C, and a 50 ohm resister for the resistor R only are respectively presented in FIG. 6. The simulated results of utilizing the resistor R and/or the capacitor C for realizing the impedance unit 208 has lower radiation power than utilizing the absorber of the prior art. Please refer to FIG. 7. FIG. 7 is a schematic diagram illustrating distribution of reflection parameters of the stub ST of the radio frequency circuit 206 of the radio frequency device 20 shown in FIG. 5, which is operated in an 8 to 16 GHz band. As can been seen in FIG. 7, the distribution of reflection parameters may move toward the area of the lower frequency after the capacitor C is added into the impedance unit 208 due to the parasitic capacitor effect of the capacitor C. In such a situation, length of the corresponding RF choke of the stub ST can be reduced in order to improve the above-mentioned offset problem.

Figure 8:
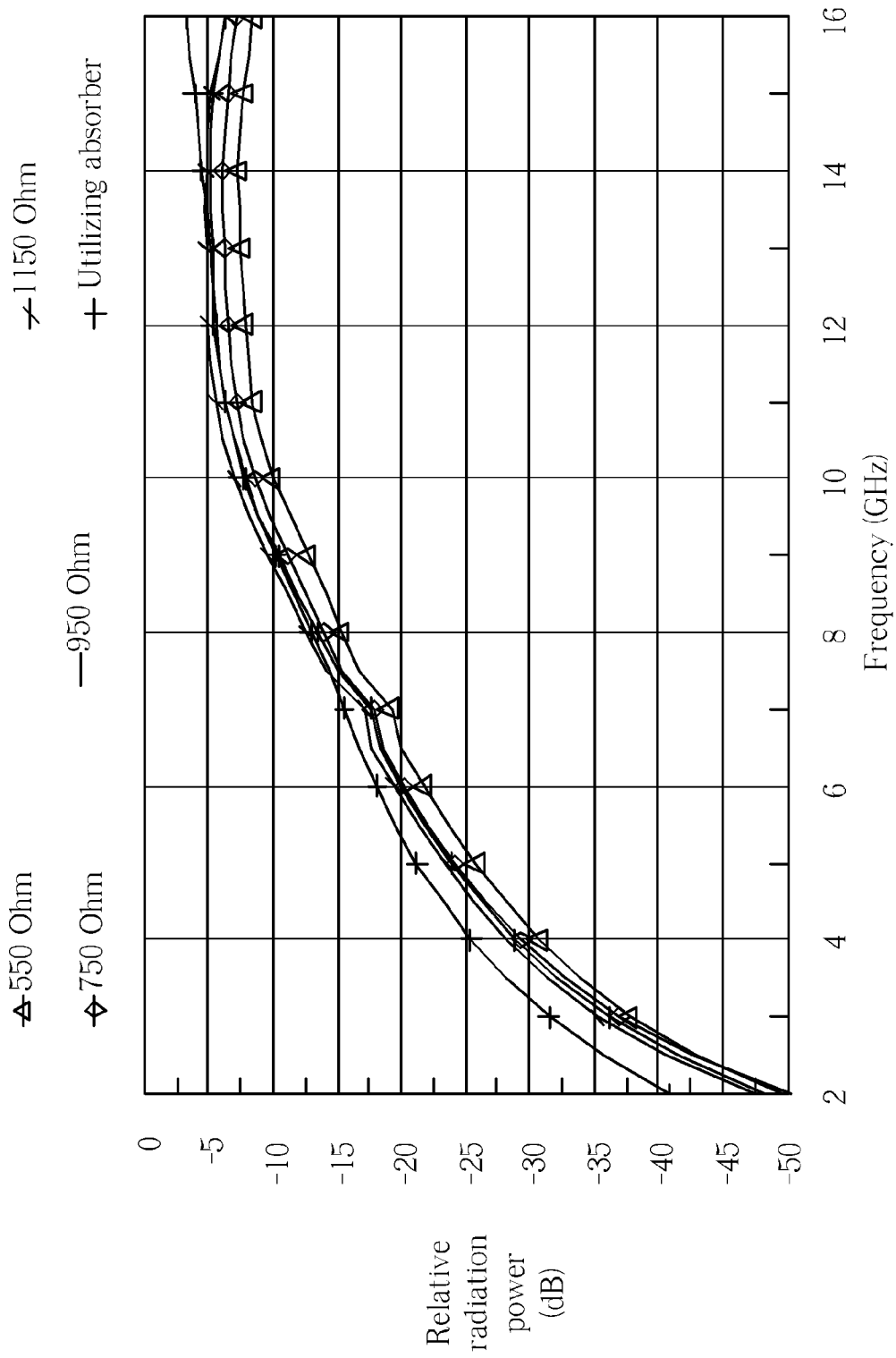
FIG. 8 is a schematic diagram illustrating radiation power of the radio frequency device shown in FIG. 5 while using various resistance values of the resistor.
Figure 9:
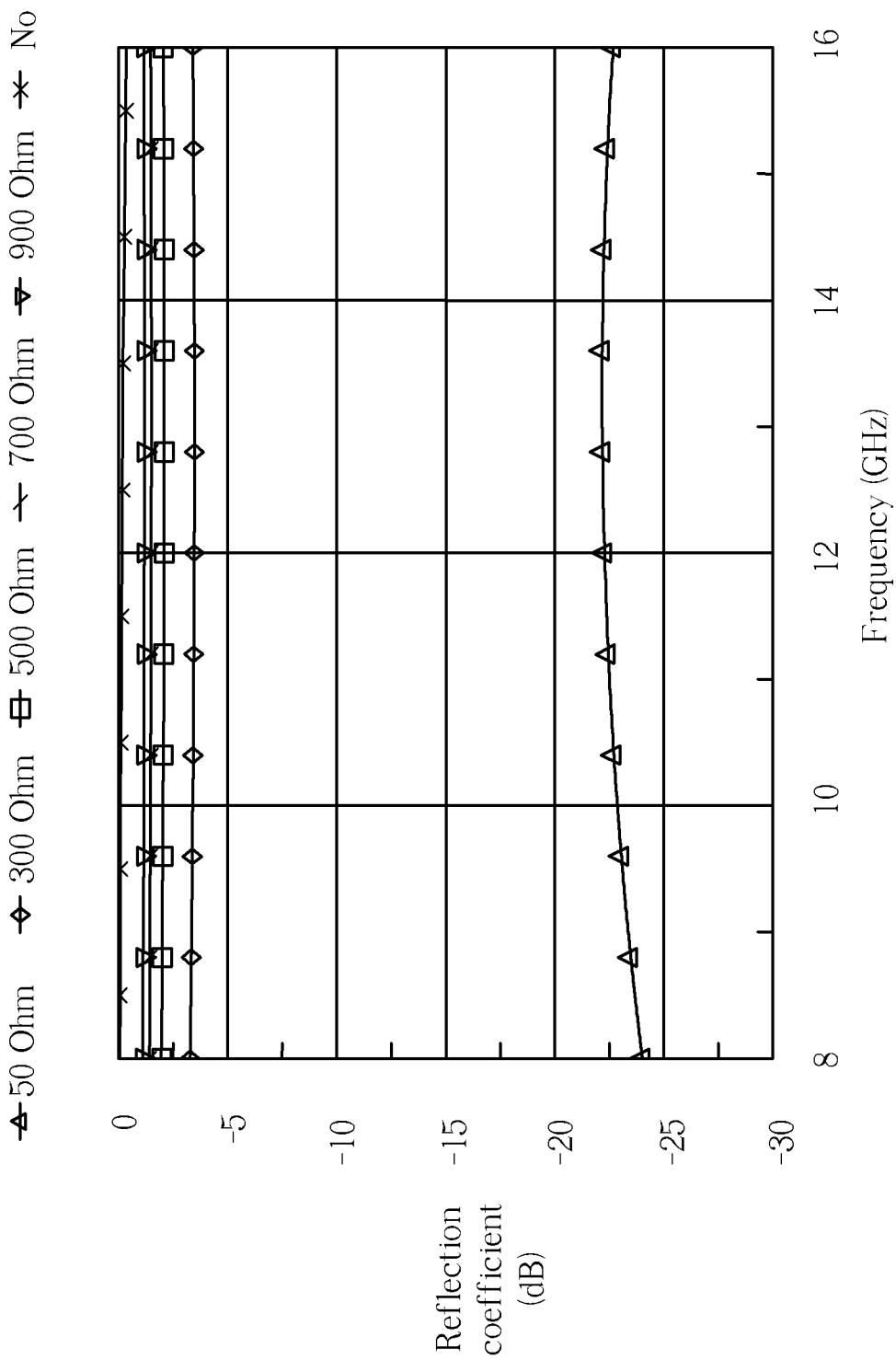
FIG. 9 is a schematic diagram illustrating distribution of reflection parameters of the radio frequency device 20 shown in FIG. 5 while using various resistance values of the resistor R.

Please refer to FIG. 8, which is a schematic diagram illustrating radiation power of the stub ST of the radio frequency circuit 206 of the radio frequency device 20 shown in FIG. 5 while using various resistance values of the resistor R. As can been seen in FIG. 8, the simulation results are represented based on using the follow resistance values of the resistor R respectively: 550 ohms, 750 ohms, 950 ohms, and 1150 ohms, and only utilizing the absorber on the stub ST. When the resistance value of the resistor R is lower than 950 ohms, the radio frequency device 20 of the invention has better radiation power suppression ability than the conventional radio frequency device using the absorber. Therefore, the invention can choose a resistor having resistance value lower than 950 ohms for realizing the resistor R. Please refer to FIG. 9, which is a schematic diagram illustrating distribution of reflection parameters of the stub ST of the radio frequency circuit 206 of the radio frequency device 20 shown in FIG. 5 while using various resistance values of the resistor R. As shown in FIG. 9, variation of reflection parameter is reduced once the resistance of the resistor R passes 500 ohms, so the invention can choose a resistor having resistance value higher than 500 ohms for realizing the resistor R for avoiding larger resistance loss of the transmission line.

Figure 10:
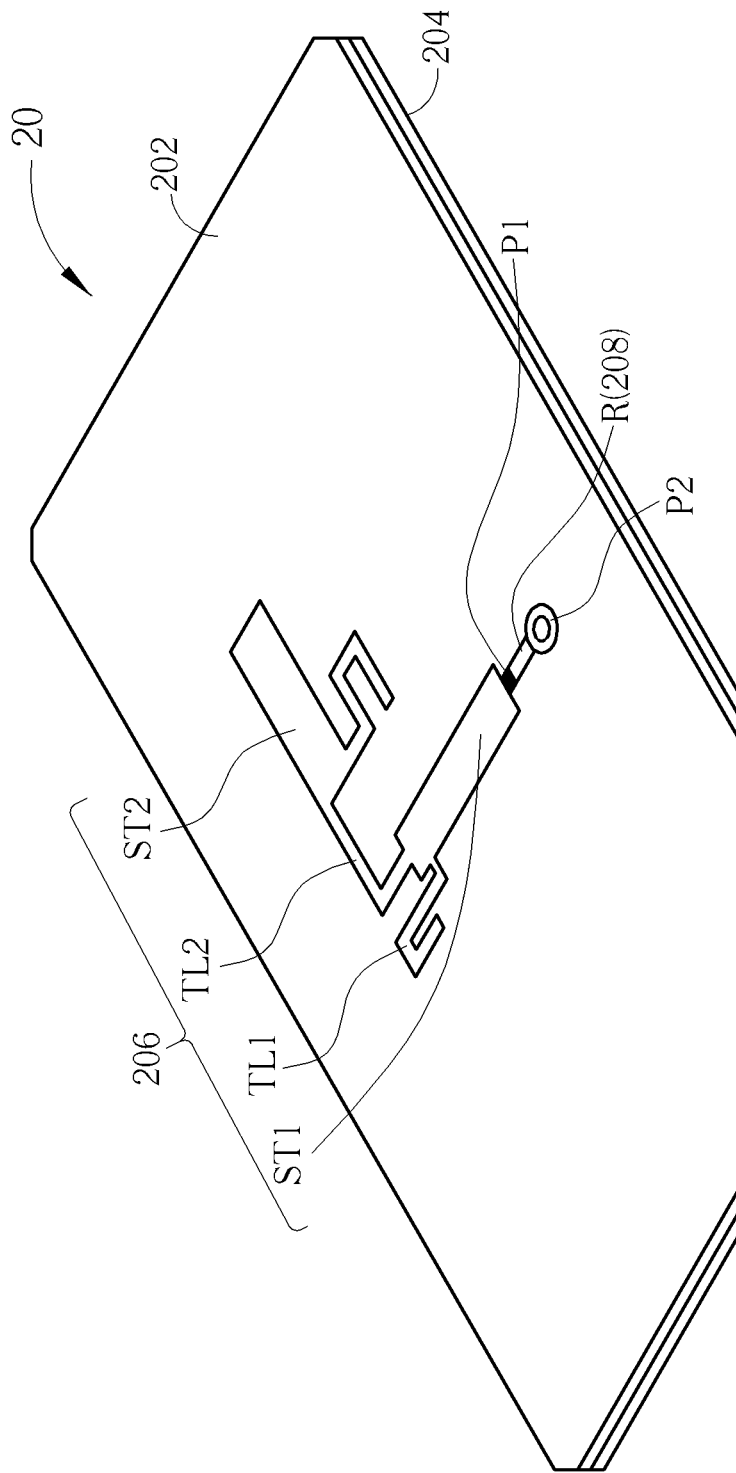
FIG. 10 is another schematic diagram of realizing the impedance unit shown in FIG. 2 by using resistor.

Please refer to FIG. 10, which is another schematic diagram of realizing the impedance unit 208 shown in FIG. 2 by using a resistor. Suppose the radio frequency circuit 206 (not shown in FIG. 3) is a low pass filter of a low noise block down-converter with integrated feed (LNBF). The low pass filter has a pass frequency range in a 0.95 to 2.15 GHz band and a cutoff frequency range in a 9.75 to 12.75 GHz band. As shown in FIG. 10, the radio frequency circuit 206 includes transmission conducting lines TL1 and TL2, and stubs ST1 and ST2. The transmission conducting line TL1 is coupled to the stub ST1. The transmission conducting line TL2 is coupled to the stub ST2. In FIG. 10, the impedance unit 208 is realized by a resistor R, which is coupled between the signal ends P1 and P2. Since the radio frequency circuit 206 is the above-mentioned low pass filter, signals of the radio frequency circuit 206 in the frequency range 9.75 to 12.75 GHz may be radiated from the stub ST1 or the stub ST2, which would cause an interference problem for other active components. Therefore, the invention utilizes the impedance unit 208 connected with the grounding layer 204 to serially connect with the open stub for suppressing the radio power of the radio frequency circuit 206. Moreover, in the embodiment, the radio frequency circuit 206 shown in FIG. 10 does not contain the DC signal, and therefore does not use capacitors for DC blocking.

Figure 11:
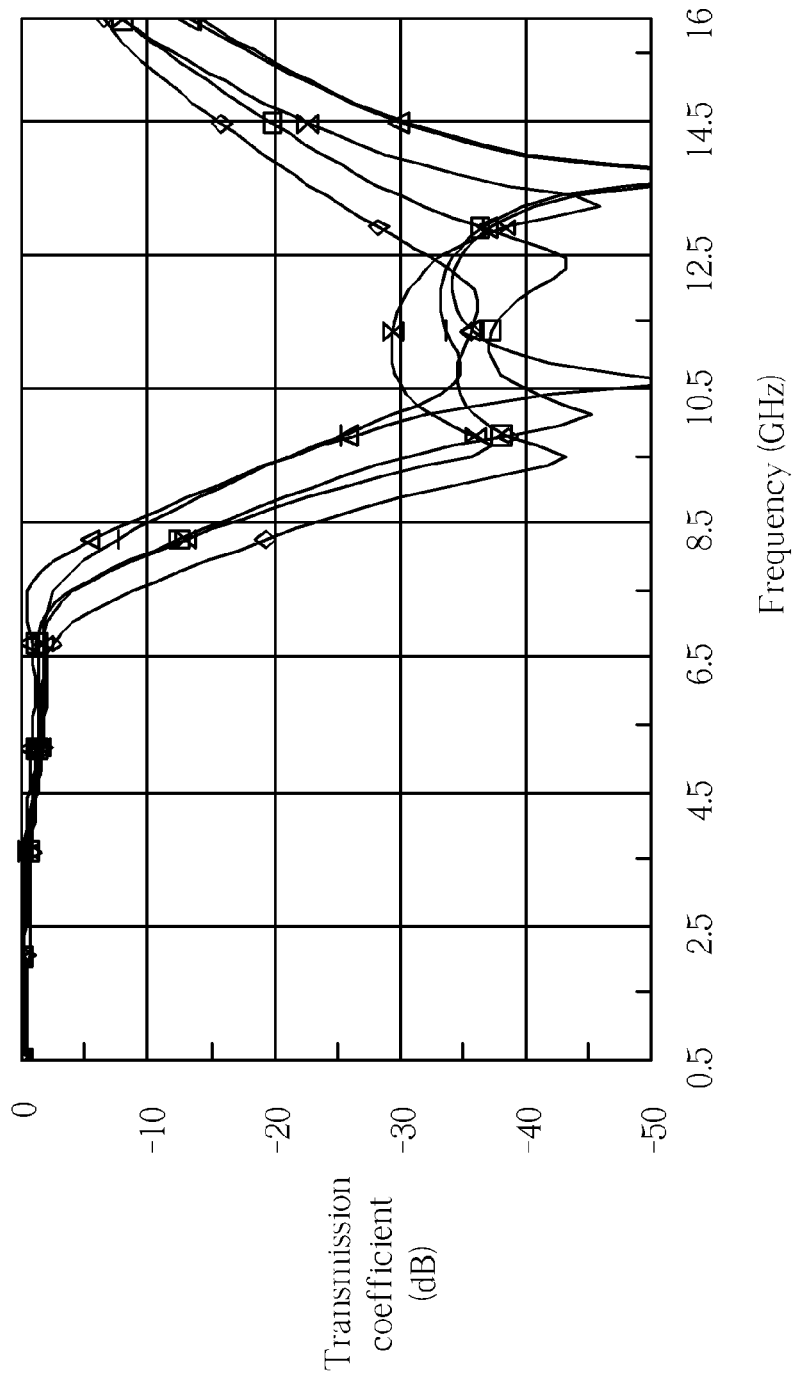
FIG. 11 is a schematic diagram illustrating distribution of transmission parameters of the radio frequency device shown in FIG. 10.
Figure 12:
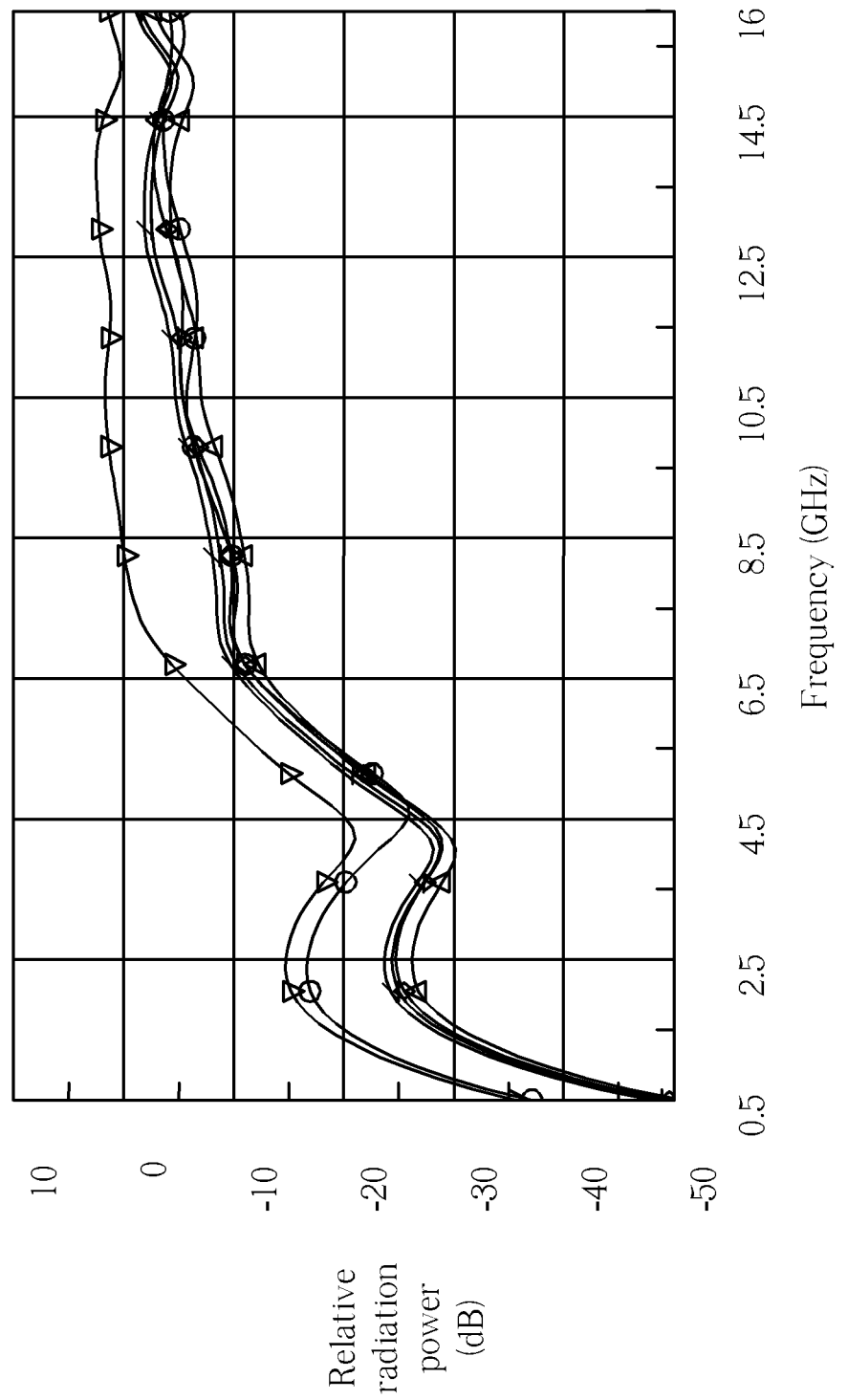
FIG. 12 is a schematic diagram illustrating radiation power of the radio frequency device shown in FIG. 10 while using various resistance values of the resistor.

Please refer to FIG. 11, which is a schematic diagram illustrating distribution of transmission parameters of the radio frequency circuit 206 of the radio frequency device 20 shown in FIG. 10. Referring to FIG. 11, the simulated result of utilizing no EMI suppression device, an absorber only on the stub ST1 or ST2 (conventional method), absorbers on both the stubs ST1 and ST2 (conventional method), and a 550 ohm resistor for the resistor R connected with the stub ST1 are respectively presented in FIG. 11. As can been seen in FIG. 11, when using the absorber method of the prior art, equivalent dielectric coefficient may be changed because of using the absorber, and the distribution of the transmission parameters may shift toward the area of lower frequency. Further referring to FIG. 11, when using the resistor R in the radio frequency device 20, the offset problem does not occur, because the resistor is regarded as an ideal resistor. However, taking into account the parasitic effect of the impedance unit 208, the offset problem will also occur. Please refer to FIG. 12, which is a schematic diagram illustrating radiation power of the radio frequency circuit 206 of the radio frequency device 20 shown in FIG. 10 while using various resistance values of the resistor R. As shown in FIG. 12, the simulation results are represented based on using the follow resistance values of the resistor R respectively: no EMI suppression device, 550 ohms, 750 ohms, 950 ohms, and 1150 ohms, and only utilizing the absorber on the stub ST1. As shown in FIG. 12, the invention has better radiation power suppression effect than the prior art. Also, as the resistance of the resistor R decreases, the suppression result of the invention becomes better.

In summary, compared with the prior art, the invention utilizes the impedance unit 208 series connected with the terminal of the radio frequency circuit 206 for reducing undesired radio power and crosstalk interference. As a result, the invention can eliminate costly manual processes of pasting the absorber to significantly reduce manufacturing costs and time. Moreover, the resistor and the capacitor are far cheaper than the absorber, and furthermore, the resistor and the capacitor can also be mounted through SMT for achieving more stable circuit characterization. In other words, the invention utilizes the resistor and the capacitor rather than using the absorber for preventing the EMI problem and reducing the manufacturing cost, and when there is no DC signal on the transmission line, the invention need only utilize the resistor for suppressing the radiation power, further reducing the manufacturing cost.

Those skilled in the art will readily observe that numerous modifications and alterations of the device and method may be made while retaining the teachings of the invention.

What is claimed is:

1. A radio frequency device, comprising:
    an isolation substrate comprising a first plane and a second plane;
    a ground layer disposed on the second plane of the isolation substrate for providing grounding;
    a first signal end formed on the first plane of the isolation substrate;
    a second signal end formed on the first plane of the isolation substrate and coupled to the ground layer;
    a radio frequency circuit disposed on the first plane of the isolation substrate and coupled to the first signal end; and
    an impedance unit disposed on the first plane of the isolation substrate and coupled to the first signal end and the second signal end;
    wherein the impedance unit comprises a resistor comprising a first end coupled to the first signal end and a second end coupled to the second signal end, and resistance of the resistor is above 500 ohms and below 950 ohms.

2. The radio frequency device of claim 1, wherein the radio frequency circuit comprises:
    a transmission line component disposed on the first plane of the isolation substrate and coupled to the first signal end.

3. The radio frequency device of claim 1, wherein the radio frequency circuit operates in Ku-band.

4. The radio frequency device of claim 1, wherein the impedance unit further comprises:
    a capacitor connected between the resistor and the second signal end, wherein the capacitor comprises a first end coupled to the second end of the resistor and a second end coupled to the second signal end and the resistor is connected between the first signal end and the capacitor.

5. The radio frequency device of claim 1, wherein the impedance unit further comprises:
    a capacitor connected between the first signal end and the resistor, wherein the capacitor comprises a first end coupled to the first signal end and a second end coupled to the first end of the resistor and the resistor is connected between capacitor and the second signal end.

6. The radio frequency device of claim 1, wherein the radio frequency circuit operates in $K_a$-band.

7. The radio frequency device of claim 1, wherein the second signal end is coupled to the ground layer via a through hole.

* * * * *